B. L. CAMPBELL.
HYDROMETER.
APPLICATION FILED FEB. 20, 1920.
1,406,342.
Patented Feb. 14, 1922.
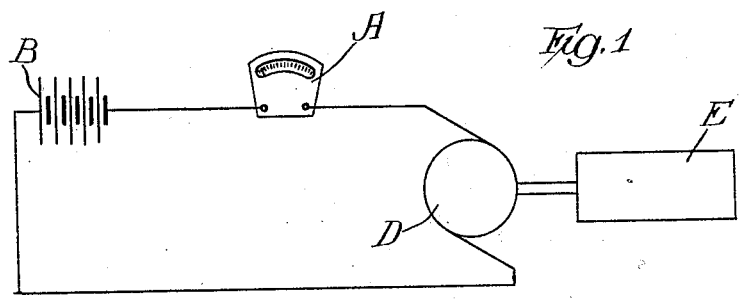
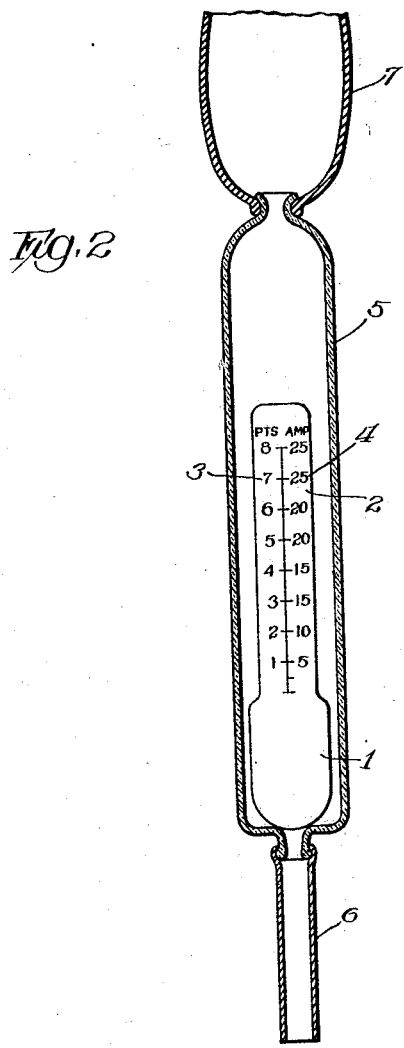
INVENTOR
B.L. Campbell
BY Munn & Co.
ATTORNEYS

UNITED STATES PATENT OFFICE.

BERT L. CAMPBELL, OF CHICAGO, ILLINOIS.

HYDROMETER.

1,406,342.     Specification of Letters Patent.     Patented Feb. 14, 1922.

Application filed February 20, 1920. Serial No. 360,150.

*To all whom it may concern:*

Be it known that I, BERT L. CAMPBELL, a citizen of the United States, and a resident of the city of Chicago, in the county of Cook and State of Illinois, have invented a new and useful Improvement in Hydrometers, of which the following is a full, clear, and exact description.

My invention relates to improvements in hydrometers, and it consists in the combinations, constructions and arrangements herein described and claimed.

An object of my invention is to provide a hydrometer to be used with storage batteries which are charged by dynamos driven by internal combustion engines, the main purpose being to provide a hydrometer which indicates the amount of fuel to be used in the engine to run the dynamo for charging the storage battery to a predetermined point.

A further object of my invention is to provide a hydrometer of the type described which not only indicates the amount of fuel, but also indicates the most desirable current for charging the battery in order that adjustments may be made to run the dynamo at a speed which will generate the current desired.

My invention is illustrated in the accompanying drawings, forming part of this application, in which—

Figure 1 is a diagrammatic view of a battery charging circuit, and

Figure 2 is a sectional view of my improved hydrometer.

In the charging of storage batteries by means of dynamos which are run by internal combustion engines, as, for instance, in small lighting or power plants, it is desirable to have means for regulating the time for charging the battery and also for regulating the amount of the charging current. To this end, recording watt meters, ignition cut-outs, resistances of various kinds, and other devices which are expensive and which are liable to easily get out of order have been used. The hydrometer which forms the subject of the present invention may be used very efficiently in the charging of the storage battery, so as to keep the battery charged without any danger of overcharging or under charging, and at the same time, to furnish an indicating means for regulating the charging current.

The manner in which the charging of the battery is regulated is very simple. A hydrometer having a bottom portion 1 and a stem 2 is provided with a vertical scale 3 indicating volumes, such as pints, and a similar scale 4 registering with the first named scale and indicating amperes. The hydrometer is provided with the usual casing 5 having a flexible tube 6 communicating with the bottom thereof, and a bulb 7 or other means of drawing liquid into the casing 5.

From the foregoing description of the various parts of the device, the operation thereof may be readily understood. With a storage battery of given capacity, a dynamo of given size, and an engine of given horse power, such as shown at B, D, and E respectively in Figure 1, it is only necessary to place the tube 6 in the liquid of the storage battery and draw up into the casing liquid which will float the hydrometer. The point at which the level of the liquid crosses the scale 3 is noted. Let us assume that it is at 3 on the scale. The operator then knows that three pints of fuel must be supplied to the engine E in order to recharge the battery. Since the charging current should be regulated in accordance with the conditions of the battery, one may look at the scale 4 and read thereon the number of amperes which, in the present instance, is 15, at which the battery should be charged. This may be done by regulating the speed of the engine E or the speed of the dynamo D, so that the ampere-meter A will indicate the proper current. The apparatus may now be left alone, and when the fuel in the engine E has been consumed, the engine will stop, thus stopping the charging of the battery.

It will be seen that by the use of my improved hydrometer, the charging of a storage battery from a dynamo driven by an internal combustion engine is a comparatively easy matter, with no danger of overcharging or undercharging while maintaining the most desirable charging current.

I claim:

A hydrometer for indicating the amount of fuel to be used in an internal combustion engine to run a dynamo for charging storage batteries to a predetermined point, and for also indicating the most desirable charging current comprising a body portion, a stem carried thereby, a vertically extending scale thereon to indicate pints of liquid fuel, and a second scale registering with the first named scale to indicate amperes.

BERT L. CAMPBELL.